United States Patent [19]

Nomiya et al.

[11] 4,037,212
[45] July 19, 1977

[54] INFORMATION PROCESSING SYSTEM

[75] Inventors: Kosei Nomiya, Tokyo; Takao Tsuiki, Kokubunji; Takeshi Kobayashi; Shinkichi Hotta, both of Kodaira, all of Japan

[73] Assignee: Hitachi, Ltd., Japan

[21] Appl. No.: 650,764

[22] Filed: Jan. 20, 1976

[30] Foreign Application Priority Data

Jan. 31, 1975  Japan .................................. 50-12581

[51] Int. Cl.² .................. G11C 7/00; G11C 17/00
[52] U.S. Cl. .............................................. 364/200
[58] Field of Search .................. 445/1; 340/172.5

[56] References Cited

U.S. PATENT DOCUMENTS

| | | | |
|---|---|---|---|
| 3,321,747 | 5/1967 | Adamson | 340/172.5 |
| 3,470,538 | 9/1969 | Harbaugh | 340/172.5 |
| 3,736,564 | 5/1973 | Watkins | 340/172.5 |
| 3,736,569 | 5/1973 | Bouricius et al. | 340/172.5 |
| 3,769,621 | 10/1973 | Osborne | 340/172.5 |

Primary Examiner—Mark E. Nusbaum
Attorney, Agent, or Firm—Craig & Antonelli

[57] ABSTRACT

In an information processing system controlled systematically by a programable logic array, the initialization of the contents of a predetermined memory circuit after switching-on the power is effected by setting the contents of the memory circuit to an initial value by means of a signal generated automatically or manually.

9 Claims, 7 Drawing Figures

INFORMATION PROCESSING SYSTEM

The present invention relates to an information processing system with initialization means, such as an electronic desk top computer having means for automatically clearing a memory circuit.

An information processing system such as electronic desk top computer comprises a memory circuit which is constituted by a flip-flop circuit or the like. At the switching-on of power, the stored value in the flip-flop circuit is meaningless. Therefore, a computing operation must be carried out after the meaningless contents which have been stored in the memory circuit at the switching-on of power are cleared.

The present inventors have already proposed an approach for automatically clearing the stored contents of a memory circuit at the switching-on of power. In this approach, an output signal from a flip-flop circuit which assumes to one stable condition or takes one stable value at the switching-on of power is applied directly to predetermined memory circuits as a clearing signal, whereas the flip-flop circuit is inverted by a key input signal from a first depressed key to release the clearing signal so that the key input signal is suitably entered. By automatically effecting the generation of a clearing signal which was manually carried out in other prior art techniques and contructing the flip-flop circuit with insulated gate or metal-insulator-semiconductor field effect transistors (hereinafter referred to as MISFETS), a clearing signal generating circuit is incorporated into a one-chip semiconductor integrated circuit for an electronic desk top computer or the like.

However, the above-described clearing method in which a clearing signal is automatically or manually generated and this clearing signal is applied directly to memory circuits whose contents are to be cleared at the switching-on of power has the drawback that it is necessary to provide special signal lines for applying the clearing signal, thus resulting in wiring complexity. For simplifying the wiring, the present invention contemplates the utilization of a programable logic array (hereinafter referred to as PLA) in an initialization process such as an automatic clearing operation in an electronic desk top computer or the like.

An object of the present invention, therefore, is to provide an information processing system using a novel initial valve value setting manner.

A further object of the invention is to provide an information processing system using a novel initial value setting manner and controlled by a PLA.

A still further object of the invention is the simplification of an initial value setting circuit in an information processing system systematically controlled by a PLA.

According to one aspect of the invention, there is provided an information processing system comprising a memory device used in processing information, a programable logic array for storing a microprogram for control of said information processing system, an address register for designating the address of a program step of said programable logic array, and a gate device for forcibly setting at least a specified digit of said address register to a constant value in accordance with an initial value setting signal, said programable logic array including at least a microprogram for setting the initial value of said memory device, the address of either one of the program steps of the initial value setting microprogram being designated to said address register in accordance with said intial value setting signal.

According to another aspect of the invention, there is provided an information processing system comprising a memory device used in processing information, a programable logic array for storing a microprogram for control of said information processing system, an address register for designating the address of a program step of said programable logic array, and a gate device for forcibly setting at least a specified digit of said address register to a constant value in accordance with an initial value setting signal, said programable logic array including at least a microprogram for setting the initial value of said memory device, said initial value setting designating the address of either one of the program steps of the initial value setting microprogram to said address register and forcibly looping said initial value setting microprogram.

The above and other objects and features of the invention will be apparent when reading the following description in conjunction with the accompanying drawings, in which.

Figure 2:
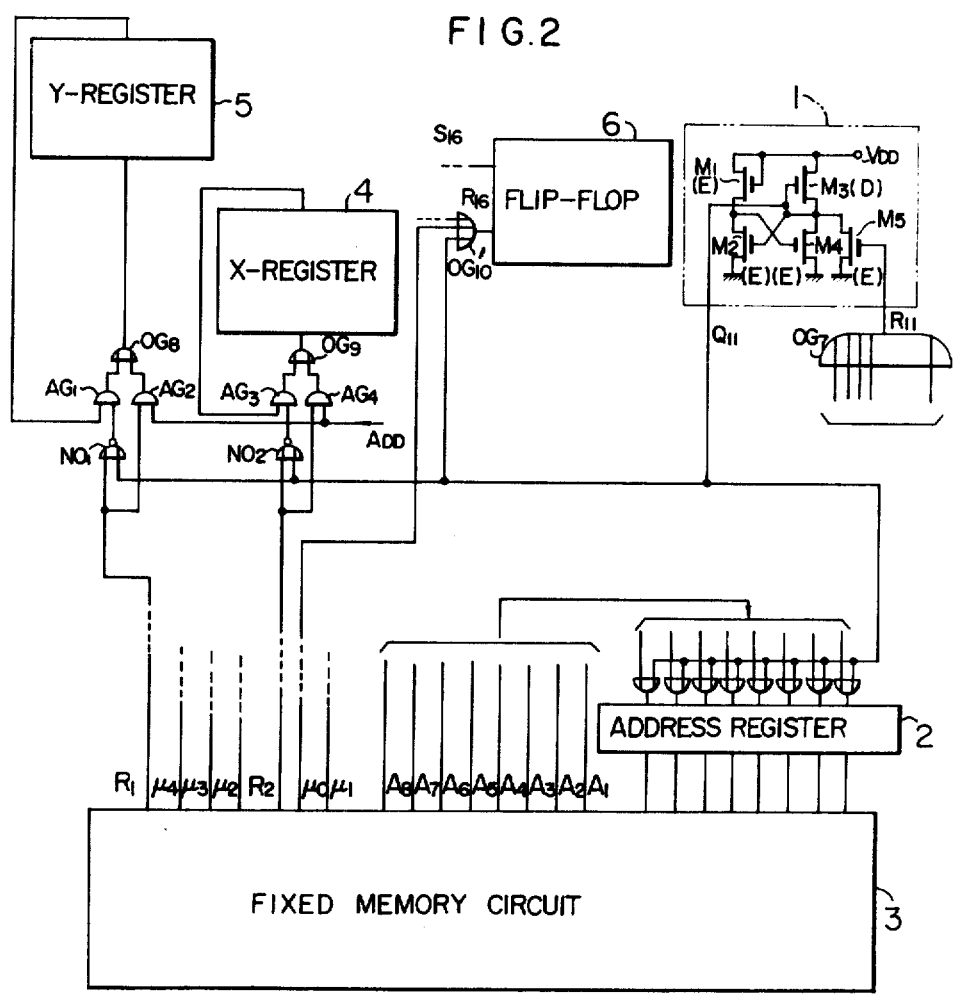
FIG. 2 is a circuit diagram for explaining an example in which an automatic clearing circuit is applied to an electronic desk top computer.

Prior to the detailed explanation of the invention, reference will be made to FIG. 2 showing an example in which an automatic clearing circuit is applied to an electronic desk top computer using a PLA and which has already been proposed by the present inventors.

The PLA realizes the system control in a digital system with simplified circuitry, thereby providing a reduction in cost due to a decrease in the number of parts used. The system control by the PLA is also called microprogram control. In FIG. 2, address information designated by an address register 2 is applied to a fixed memory circuit 3 in which a microprogram is stored. An X register 4 is designated by an output of the fixed memory circuit 3, for example, an output $R_2$, and an AND gate $AG_4$ is thereby enabled to set information ADD from an adder into the X register 4. On the other hand, address information $A_1$ to $A_8$ for the next step (next address information) is applied to the address register 2 for a subsequent operation. Such a digital system includes various memory circuits whose stored contents must be cleared after the switching-on of power and before a desired arithmetic operation. For example, there are an X register 4, a Y register 5, a Z register (not shown), an M register (not shown), a conditional flip-flop 6 for storing a type of arithmetic calculation, and an address register 2. The present inventors proposed to clear meaningless stored contents of these memory circuits by applying, at the switching-on of power, an output $Q_{11}$ or clearing signal from a flip-flop circuit 1 in one stable condition to the memory circuits. Namely, the flip-flop 6 is reset by applying the clearing signal through an OR gate $OG'_{10}$ to a reset input $R_{16}$ of the flip-flop 6, the stored contents of the X and Y registers 4 and 5 constructed by shift registers are cleared by applying the clearing signal to AND gates $AG_1$ and $AG_3$ of the respective feedback loops to cut off these loops, and the address register 2 constructed by flip-flops is applied with the clearing signal commonly to the respective digits. Thus, the initial values of the memory circuits are set.

The flip-flop circuit 1 comprising a depletion type load MISFET $M_3$ and an enhancement type load MISFET $M_1$ is rendered stable such that a drive MISFET $M_2$ turns on first since the gate voltage of the MISFET $M_2$ first reaches its threshold level at the switching-on of power. Alternatively, an operation similar to the above-described operation may be achieved by making the threshold voltage of the drive MISFET $M_2$ smaller than that of a MISFET $M_4$.

However, the above-described clearing method in accordance with which the clearing signal is automatically generated and directly applied to the memory circuits whose contents are to be cleared at the switching-on of power is disadvantageous in that signal lines for applying the signals are necessary, thus resulting in wiring complexity.

These drawbacks are eliminated by an information processing system of the invention systematically controlled by a PLA, wherein the initialization of a predetermined memory circuit after the switching-on of power is made by setting the contents of the memory circuit to an initial value by means of a signal generated automatically or manually.

Figure 1:
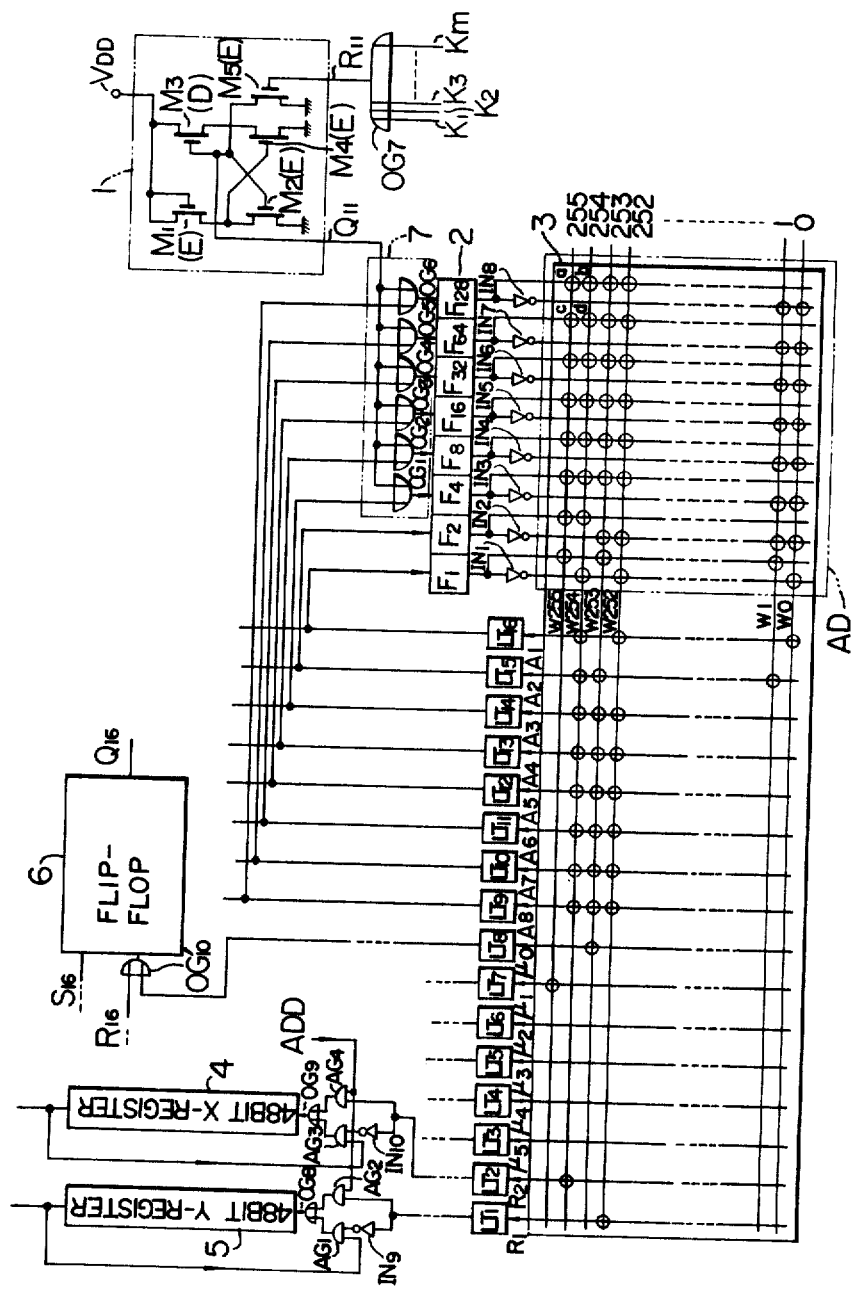
FIG. 1 is a circuit diagram showing an embodiment of the invention.

FIG. 1 is a circuit diagram showing an example of the main parts of an embodiment of the invention which is applied to an automatic clearing operation of electronic desk top computer.

Figure 6:
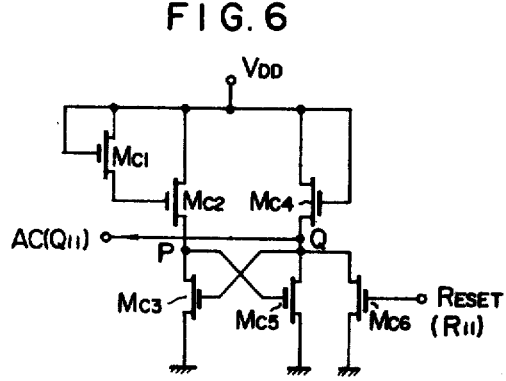

In the figure, reference numeral 1 designates an initial value setting signal generating flip-flop circuit which comprises MISFET's $M_1, M_2, \ldots M_5$. With the load MISFET's $M_1$ and $M_3$ constructed of enhancement and depletion types respectively, at the switching-on of power the drive MISFET $M_2$ always reaches its threshold gate voltage earlier than the drive MISFET $M_4$ cross-coupled with the MISFET $M_2$, so that the MISFET $M_2$ is first turned on thereby rendering the flip-flop circuit 1 stable. The MISFET $M_5$ is provided for resetting the flip-flop circuit 1, and this MISFET $M_5$ is turned on by a key input signal ($K_1, K_2, \ldots K_n$) first entered after the switching-on of power so that the output of the flip-flop circuit 1 is inverted. It should be appreciated that the initial value setting flip-flop circuit 1 is not limited to the illustrated example and may use any circuit which becomes to its one stable condition at the switching-on of power. For example, a circuit as shown in FIG. 6 may be used.

Figure 3:
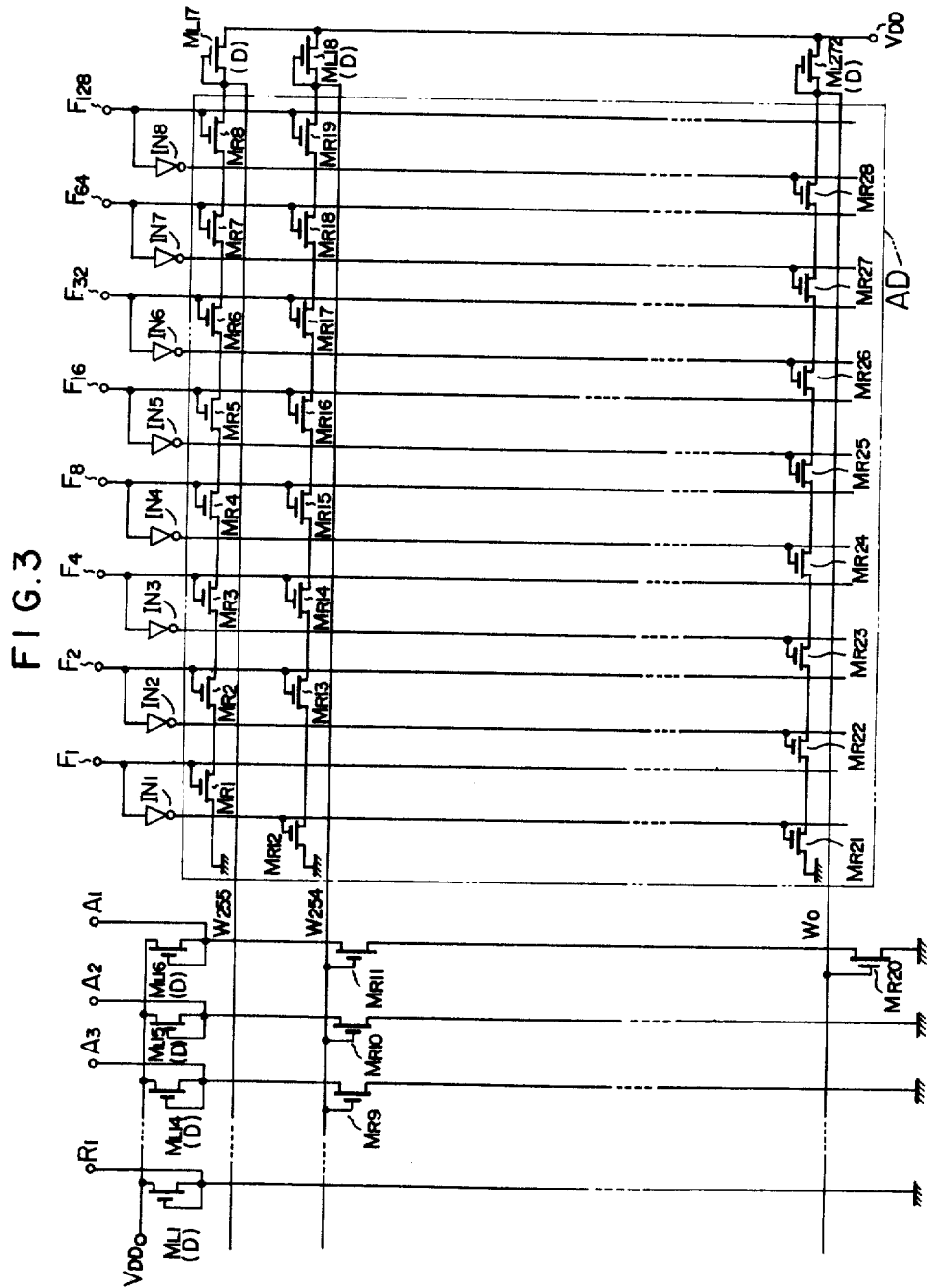
FIGS. 3, 4, 5, 6 and 7 show concrete circuits for various parts shown in FIG. 1, respectively.
Figure 5:
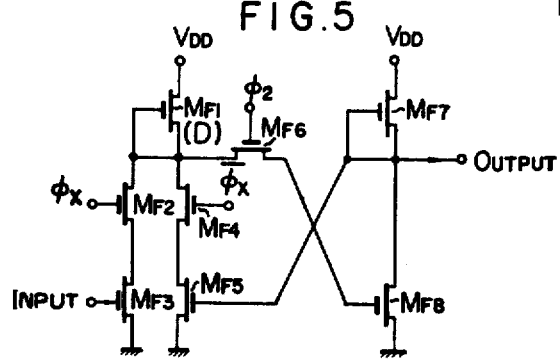

Reference numeral 2 designates an address register which comprises latch circuits $F_1, F_2, F_4, \ldots F_{128}$. Each of the latch circuits $F_1, F_2, F_4, \ldots F_{128}$ is constructed by a MOS circuit shown in FIG. 5. The address register 2 designates an address of control information (or microprogram) stored in a fixed memory circuit 3. The fixed memory circuit 3 is constructed as a read-only memory (ROM) comprising MISFET's, as shown in FIG. 3. For example, symbols $a, b, c$ and $d$ in FIG. 1 correspond to MISFET's $M_{R8}, M_{R19}, M_{R7}$ and $M_{R18}$ in FIG. 3 respectively.

Latch circuits $LT_1, LT_2, \ldots LT_{16}$ with a construction similar to the latch circuits $F_1, F_2, \ldots F_{128}$ are provided for temporarily storing the output information ($R_1, R_2, \mu_0, \mu_1, \ldots \mu_5, A_1, A_2, \ldots A_8$) from the fixed memory circuit 3.

Figure 4:
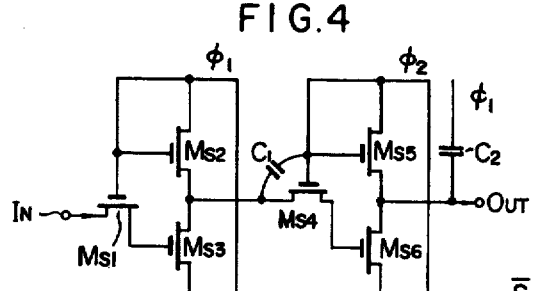
Figure 7:
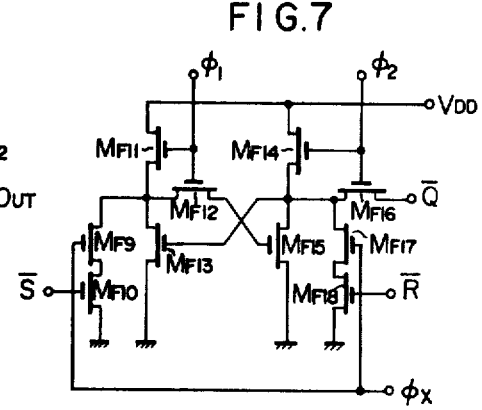

Reference numerals 4 and 5 designate respectively X and Y shift registers each of which comprises forty-eight series-connected MOS circuits shown in FIG. 4. Numeral 6 designates a typical set-reset type flip-flop which may be constructed by a MOS circuit as shown in FIG. 7. Numeral 7 designates a gate circuit for forcibly setting a special digit of the address register 2 to a constant value in accordance with the output signal $Q_{11}$ of the initial value setting signal generating flip-flop 1. The gate circuit 7 comprises OR gates $OG_1, OG_2, \ldots OG_6$.

In the operation of the system shown in FIG. 1, the output $Q_{11}$ or clearing signal of the flip-flop circuit 1 which assumes to its one stable condition or takes one stable value at the switching-on of power is applied through the OR gates $OG_1, OG_2, \ldots OG_6$ of the gate 7 to the digits $F_4, F_{128}$ of the address register 2 except for the two lower digits $F_1$ and $F_2$. The respective initial values of the six upper digits $F_4, \ldots F_{128}$ of the address register 2 are thus fixed. When the digits $F_4 \ldots F_{128}$ are fixed, for example, at "1", the address register 2 designates one of the addresses 252 to 255 since the values at which the two lower digits $F_1$ and $F_2$ become stable are not defined. Therefore, the contents of a predetermined memory circuit can be cleared by repeatedly designating the addresses 252 to 255 in which the programs are stored for clearing the predetermined memory circuits until the release of a clearing signal.

The clearing operation is carried out in the following manner. For example, when it is desired to clear all the stored contents of the Y register 5 to "0", the address register 2 designates the address 252 whose information in turn is entered into the fixed memory circuit or ROM 3. The output $R_1$ of the fixed memory circuit 3 is applied to the AND gate $AG_1$ forming a feedback loop of the Y register 5, thereby cutting off the feedback loop. Similarly, for the clearing of the flip-flop 6, the address register 2 designates the address 253 to derive the output $\mu_o$ from the fixed memory circuit 3 which output in turn is applied to the reset input $R_{16}$ of the flip-flop 6.

With respect to the X register 4 whose output is supplied to display means, when it is desired to display numeral "0" at the lowest digit and to display no numeral at or enter a zero suppression code (for example, 12) to the other digits, the address register 2 designates the address 254 to derive the output signal $R_2$ from the fixed memory circuit 3 for enabling the AND gate $AG_4$, while a control signal is applied to an adder (not shown) which in turn forms a zero suppression code (for example, 12). The information from the adder is applied through the AND gate $AG_4$ to all digits except the lowest digit to set zero suppression code information therein, and the "0" information from the adder is entered to the lowest digit. Similarly, another register such as a Z register (not shown) may be cleared by means of the address 255.

The address next to the address 255 or the next address (output information of $A_1, A_2, \ldots A_8$), as shown in a matrix form of ROM's in the block 3 of FIG. 1, indicates the address 128 which is an actual process starting address in the information processing system. However, in the case where the program step of the address 255 is designated, the output of the initial value setting signal generating flip-flop circuit 1 forcibly fixes the contents of the address register 2 to the address 255 through the gate circuit 7 as long as that output is in at the level "1". Thus, the program steps of the initial value setting microprogram are again and successively carried out for the addresses 252, 253, 254 and 255 to repeat the setting of the respective memory circuits to their initial values.

Next, when a key input signal from a key which is first depressed is applied to the reset input $R_{11}$ of the flip-flop circuit 1 through the OR gate $OG_7$, the flip-flop circuit 1 is inverted so that the clearing signal is released. With the clearing signal released, address information designating the fixed memory circuit 3 is entered to the address register 2. As a result, the program loop for the clearing operation is released from the address 255 and a jump takes place to a program address, i.e. address 128 for a predetermined system control in accordance with the next address information or output information $(A_1, A_2, \ldots A_8)$.

As described in the foregoing, the invention utilizes the clearing operation for system control based on PLA, instead of the direct application of a clearing signal to memory circuits. Therefore, any special signal line for supplying to each memory circuit can be omitted and the simplification of wiring can be achieved. Further, since the initialization of the memory circuit is carried out by the microprogram, the initial value can be easily and arbitrarily modified by merely changing the pattern of microprogram storing ROM's in accordance with the user's requirements.

It should be appreciated that the invention is not limited to the above-described embodiment and may include various modifications. For example, in the case where a clearing signal is generated in a manual manner, a predetermined digit of the address register may be fixed on the basis of a signal obtained by the depression of a clearing key. In the case where a clearing signal is generated in an automatic manner, any suitable circuit may be used for generating a clearing signal. The number and address of program steps for clearing memory circuits may arbitrarily determined depending upon the system. It is of course that as well as an automatic clearing operation, any manner of setting an initial value as required in the system, as in the case of setting the initial value of X register, may be employed.

The invention is widely applicable to the initial value setting manner in information processing systems such as electronic desk top computers controlled systematically by a PLA.

What is claimed is:

1. In an information processing system including:
    a memory in which a microprogram for processing information is stored;
    an address register for designating the addresses of program information stored in said memory;
    a plurality of storage circuits coupled to said memory and selectively receiving program information stored in said memory; and
    means, coupled to said storage circuits and said address register, for setting the contents of said storage circuits at prescribed values upon the turn-on of said system;
    the improvement wherein said means comprises
    first means for generating a first prescribed signal upon the turn-on of said system,
    second means, coupled to said first means and said address register, for coupling said first prescribed signal to a plurality of selected bit positions of said address register corresponding to a plurality of selected addresses of said memory, and
    wherein said plurality of selected addresses of said memory have been programmed to store said prescribed values for setting the contents of said storage circuits, and
    third means, coupled to said address register, for selectively addressing individual ones of the bit positions of said plurality of selected bit positions of said address register, and thereby causing the contents of the individual ones of said selected addresses of said memory to be coupled to respective ones of said plurality of storage circuits.

2. The improvement according to claim 1, wherein said memory includes a microprogram logic array for selectively supplying control signals to said storage circuits, said microprogram logic array comprising a plurality of control output lines for supplying said control signals thereover, a plurality of address lines to which address signals for designating the addresses of matrix positions in said array are applied, and a matrix of coupling elements selectively connected to said address lines and said control output lines and providing prescribed control signals on selected control output lines in response to the receipt of address signals on selected address lines.

3. The improvement according to claim 2, wherein said memory further includes an address decoder having a plurality of address drive lines respectively connected to the address lines of said microprogram logic array, a plurality of bit position input lines respectively connected to the bit positions of said address register, and a matrix of further coupling elements selectively connected to said address drive lines and said bit position input lines for decoding the signals produced on said bit position input lines and producing an address signal on a selected one of said address drive lines in accordance with the state of the bit positions of said address register.

4. The improvement according to claim 1, wherein said first means comprises a flip-flop which is placed in a prescribed one of its stable states upon the turn-on of said system.

5. The improvement according to claim 4, further comprising means for resetting said flip-flop into the other of its stable states after the turn-on of said system, thereby removing said first prescribed signal from said second means and said address register.

6. The improvement according to claim 5, wherein said microprogram logic array and said address decoder are comprised of a read-only memory.

7. The improvement according to claim 3, further including a plurality of latch circuits coupling said control output lines to said storage circuits, and wherein selected ones of said latch circuits are connected to respective bit positions of said address register.

8. The improvement according to claim 3, wherein said address register has $n$ bit positions and wherein said plurality of selected bit positions of said address register is less than $n$ and constitute the most significant $m$ bit positions of said address register.

9. The improvement according to claim 8, further comprising means for sequentially effecting binary addressing of the least significant $n-m$ bit positions of said address register to thereby sequentially designate the individual ones of said plurality of selected addresses of said memory and cause said prescribed values to be sequentially applied to respective ones of said storage circuits.

* * * * *